No. 625,228. Patented May 16, 1899.
G. H. WILLETTS.
CLUTCH.
(Application filed Oct. 15, 1898.)
(No Model.)
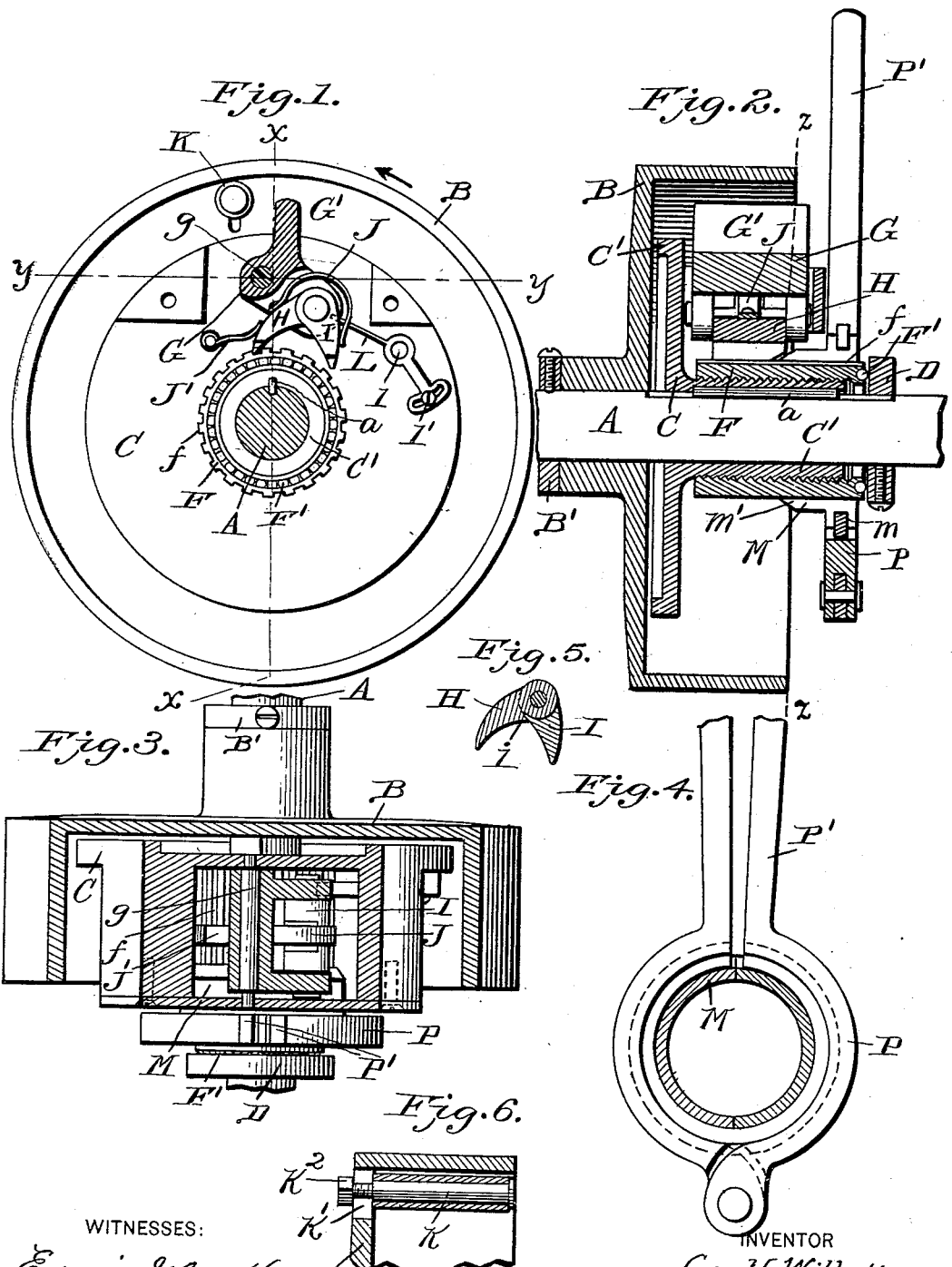
WITNESSES:
Edwin G. McKee
G. M. Anderson
INVENTOR
Geo. H. Willetts
BY E. W. Anderson
his ATTORNEY.

UNITED STATES PATENT OFFICE.

GEORGE H. WILLETTS, OF BEAVER FALLS, PENNSYLVANIA.

CLUTCH.

SPECIFICATION forming part of Letters Patent No. 625,228, dated May 16, 1899.

Application filed October 15, 1898. Serial No. 693,656. (No model.)

*To all whom it may concern:*

Be it known that I, GEORGE H. WILLETTS, a citizen of the United States, and a resident of Beaver Falls, in the county of Beaver and State of Pennsylvania, have invented certain new and useful Improvements in Clutches; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a section on the line $z\ z$, Fig. 2. Fig. 2 is a section on the line $x\ x$, Fig. 1. Fig. 3 is a section on the line $y\ y$, Fig. 1. Fig. 4 is a detail view, partly in section, of the lever-clamp and reversing device. Fig. 5 is a sectional detail view of the two pawls. Fig. 6 illustrates the adjustable cam-roller.

This invention is designed to provide a friction-clutch which is simple in its construction, strong and durable in character, and which will readily and perfectly adjust itself to any load which it may be called upon to carry; also, to provide a clutch of this character which can be readily attached to a pulley or shaft coupling and be adjusted to start the load to full speed in any given time.

With these objects in view the invention consists in the novel construction and combination of parts, all as hereinafter described, and pointed out in the appended claims.

Referring to the accompanying drawings, the letter A designates a continuously-moving shaft.

B designates the loose member of the clutch, which in the present instance is a belt-pulley, and C is the relatively-fixed member of the clutch, which is mounted on the shaft A by means of a spline or key $a$ to rotate therewith, but having a longitudinal movement toward and away from the member B. Said member C has the extended frictional face $c$, of any suitable character, which is adapted to be brought into contact with the face of the member B.

D is a collar fast on the shaft A, and between which and the member B the member C has its longitudinal movement.

B' is a collar upon the opposite side of the member B and which holds the latter against endwise movement on the shaft in that direction.

F is a nut which is screwed upon the sleeve or boss C' of the member C with a right-hand thread, and which is formed with teeth $f$. F' are antifriction devices between said nut and the collar D.

G designates a pawl-carrier which is pivoted at $g$ to the member C, and to which are pivoted two pawls H and I, which are arranged respectively to engage the teeth of the nut F upon opposite sides of said nut, as shown. J and J' are springs, one of which is arranged to press upon each of said pawls to hold it in the direction of its work.

The pawl-carrier G has a projection G', which is designed to be engaged, as hereinafter more fully described, by a cam-roller K, which is carried by the clutch member B. The pin or stud $k$ upon which said cam-roller is mounted and journaled is adjustable toward and away from the axis of the shaft A in a slot $k'$ in which it is seated, being secured by a nut $k^2$.

L is a spring which acts upon the pawl-carrier G in the reverse direction to the cam K, its free end being seated in a recess in said carrier. Said spring is pivoted at $l$ and has an adjustment at $l'$.

M is a reversing device consisting of a split sleeve which fits around the end portion of the nut on the hub or sleeve of the clutch member C, and which is formed with an exterior annular groove $m$. This sleeve is fitted to slide endwise on the said nut and has a beveled end portion $m'$, which is adapted to engage underneath the pawls (see Fig. 2) and raise one or both of them from engagement with the nut F. The pawl H is made longer than the pawl I and extends farther toward the sleeve D, so that it will be engaged by the reverser and raised from engagement with the nut before the pawl I is engaged. The pawl H has a shoulder $i$, against which the pawl I has a bearing, so that while the two pawls may be swung away from each other they cannot be moved nearer together than the positions shown.

P designates a lever-clamp composed of two pivotally-connected semicircular jaws which loosely fit the groove $m$ of the reversing device and which are provided with adjacent handle extensions P'. These handles must in use be provided with a bearing with which they can be engaged to secure the reverser in the position in which it is placed.

The operation of the clutch is as follows: The member B being idle and it being desired to start it in operation, the lever P is operated to withdraw the reverser M from engagement with the pawls, thereby allowing the pawl H to engage the teeth of the nut. It will be observed that the shaft A and clutch member C, with its nut, pawl-carrier, and pawls, are revolving as one piece, while the member B is stationary. Therefore upon each revolution of the shaft A the projection G' of the pawl-carrier is engaged by the cam-roller K. The said carrier is thereby rocked on its pivot, and by this action the pawl H is caused to rotate the nut at each revolution a distance in proportion to the degree of movement of the said carrier. As said nut is thus rotated on its thread at each revolution of the shaft A it is moved out against the collar D, thereby forcing the member C in the opposite direction until its friction-face is brought into contact with the face of the member B and the clutch gradually commences to take the load. As soon as the speed of the member B becomes equal to that of the member C and there is no longer any relative difference of movement of the two members the pawl-carrier of course ceases to be acted upon by the cam. If, however, the load be increased to such an extent as to cause slippage between the members, the pawl-carrier will again be acted upon by the cam and the clutch will be set that much tighter. The clutch will therefore adjust itself perfectly to any load that may be thrown upon it. By adjusting the cam toward or away from the axis of the shaft A the degree of movement which it gives the pawl-carrier and pawl H is correspondingly changed and a longer or shorter time is accordingly required to set the clutch. This may be regulated according to the circumstances and the character of the work. When it is desired to throw the load off the clutch, the reverser is moved in a sufficient distance to raise the pawl H from engagement with the teeth of the nut. The handles P' of the clamp P are then slightly squeezed or pressed together, thereby compressing the reversing device upon the nut, holding the latter momentarily against rotary movement with the other parts, and causing it to be moved upon its thread sufficiently to cause the clutch to slip slightly. The reverser is then moved a little farther, and the spring J' causes the pawl I to be engaged with the nut, which is thereby moved inward away from the collar D and entirely relieves the frictional contact between the clutch members. When the clutch is entirely relieved of the load, the reverser is given a further movement to lift the pawl I out of engagement with the teeth of the nut. Inasmuch as the engagement of the clutch when set is only just enough to carry the load, a very slight movement of the nut under the clamping action of the reverser is sufficient to cause enough slippage to enable the pawl I to operate said nut. In case it is not desired to throw the load off as slowly as it was thrown on the reverser may be moved far enough at first to hold both pawls out of engagement. The handles P' of the clamp P are then grasped and brought toward each other, thereby setting the jaws upon the reversing device and compressing it upon the nut and holding the latter against rotary movement, as above described, so that it is at once moved back from the collar D to release the clutch.

The member A can be of any desired diameter, the larger the diameter the greater being the leverage which may be obtained on the nut F through the action of the cam, the pawl-carrier, and the pawls.

It will be obvious that the construction and arrangement of parts may be changed somewhat from that herein shown and described without departing from the spirit and scope of my invention.

Having thus described my invention, what I claim as new, and desire to secure by Letters Patent, is—

1. In a friction-clutch, the combination with the loose member, and a relatively-fixed member having a friction-surface, of a reversible pawl-and-ratchet device carried by the fixed member and arranged to move it toward and away from the loose member, and a cam device carried by the loose member and arranged for operative engagement with the said pawl-and-ratchet device, substantially as specified.

2. In a friction-clutch, the combination of a loose member, a relatively-fixed member, a toothed nut threaded on said fixed member, an end bearing for said nut, a pivoted pawl-carrying device carried by said fixed member, the oppositely-acting pawls attached to said device, means for reversing the action of said pawls, and a device carried by the fixed member and adapted to operatively engage the pawl-carrying device, substantially as specified.

3. In a friction-clutch, the combination of a loose member, a relatively-fixed member, a nut threaded on the hub of the fixed member and arranged to move same into and out of contact with the loose member, and devices operated by difference in the relative movement of the two members for actuating said nut in both directions, substantially as specified.

4. In a friction-clutch, the combination of a loose member, an adjustable cam device carried thereby, a relatively-fixed member having a nut arranged to move it toward and away from the loose member, and devices operatively engaging said nut and operatively engaged by the cam device for actuating said nut, together with means for reversing the operation of said devices and thereby the direction of movement of the nut, substantially as specified.

5. In a friction-clutch, a loose member having a peripherally-located adjustable cam device, a relatively-fixed member having an eccentrically-pivoted pawl-carrying device, a movable toothed nut on said fixed member, an end bearing for said nut, pawls carried by the said carrying device, and adapted to engage the teeth of said nut respectively upon its opposite sides, and means whereby either one or both of said pawls may be moved out of position to engage the said nut, substantially as specified.

6. In a friction-clutch, the combination of the loose member, its cam device, the fixed member, its toothed actuating-nut, the end bearing for said nut, the pivoted spring-pressed pawl-carrier arranged to be operated by the cam device, the two pawls carried by said carrier, and adapted to engage the teeth of the nut upon its opposite sides respectively, a longitudinally-movable pawl-reverser mounted on said nut, and means for actuating said pawl-reverser, substantially as specified.

7. In a friction-clutch, the combination with a loose member, a relatively-fixed member, a nut threaded on the hub thereof and arranged to move said fixed member toward and away from the loose member, and devices operated by difference in the relative movement of said members to actuate said nut, of means for throwing out of operation the said devices and for holding the nut fixed with respect to rotary movement with said fixed member to release the clutch, substantially as specified.

8. The combination of a loose member having a cam device, a relatively-fixed friction member movable toward and away from the loose member, a nut for actuating said fixed member, pawl devices for operating said nut and operated by the cam device, a split pawl-reverser slidably mounted on said nut, and a clamping device engaging said pawl-reverser, substantially as specified.

9. In a friction-clutch, the combination with the nut, which actuates the relatively-fixed member of the clutch to move it toward and away from the loose member, the pawls which engage opposite sides of said nut, and means for actuating said pawls, of the split pawl-reverser slidingly mounted upon said nut, and the lever-clamp which embraces said pawl-reverser, substantially as specified.

10. In a friction-clutch, the combination with the toothed nut which actuates the relatively-fixed member of the clutch to move it toward and away from the loose member, pawls which engage opposite sides of the said nut, one of said pawls being longer than the other, and means for actuating said pawls, of the split pawl-reverser slidingly mounted upon said nut and adapted to successively engage and raise said pawls, and a lever-clamp which embraces said pawl-reverser and is adapted to clamp it to the said nut, substantially as specified.

11. In a friction-clutch, the combination of a loose member, a relatively-fixed member, a toothed nut threaded on said fixed member, an end bearing for said nut, antifriction devices between said nut and end bearing, a pivoted pawl-carrying device carried by said fixed member, the oppositely-acting pawls attached to said device, means for reversing the action of said pawls, and a device carried by the fixed member and adapted to operatively engage the pawl-carrying device, substantially as specified.

In testimony whereof I affix my signature in presence of two witnesses.

GEORGE H. WILLETTS.

Witnesses:
C. B. WHITE,
JOS. C. ROUZER.